United States Patent [19]

Muller et al.

[11] 4,327,769

[45] May 4, 1982

[54] UNDERGROUND TANK FILL PIPE COMBINATION

[75] Inventors: Ralph C. Muller, Hopewell Junction; Thomas R. Decker, Wallkill, both of N.Y.

[73] Assignee: Texaco Inc., White Plains, N.Y.

[21] Appl. No.: 118,932

[22] Filed: Feb. 6, 1980

[51] Int. Cl.³ .............................................. F16K 45/00
[52] U.S. Cl. ..................................... 137/587; 137/433
[58] Field of Search ............. 137/587, 589, 433, 588, 137/388; 220/85 VR, 85 VS

[56] References Cited

U.S. PATENT DOCUMENTS

| 395,460 | 1/1889 | Sieghold | 137/433 |
|---|---|---|---|
| 2,344,304 | 3/1944 | Hooper | 137/433 X |
| 3,858,603 | 1/1975 | Lenz | 137/433 |

FOREIGN PATENT DOCUMENTS

| 92333 | 2/1962 | Denmark | 137/433 |
|---|---|---|---|
| 7612387 | 11/1976 | Netherlands | 137/433 |

*Primary Examiner*—William R. Cline
*Attorney, Agent, or Firm*—Carl G. Ries; Robert A. Kulason; Henry C. Dearborn

[57] ABSTRACT

A combination of elements for use with an underground tank that has a fill tube which is below ground level and subject to rainwater immersion. It has special application to a fill tube closure that has a small diameter passageway to maintain atmospheric pressure in the fill tube. It includes a float valve to close the passageway if the rainwater rises above a given level adjacent to the top of the fill tube.

1 Claim, 3 Drawing Figures

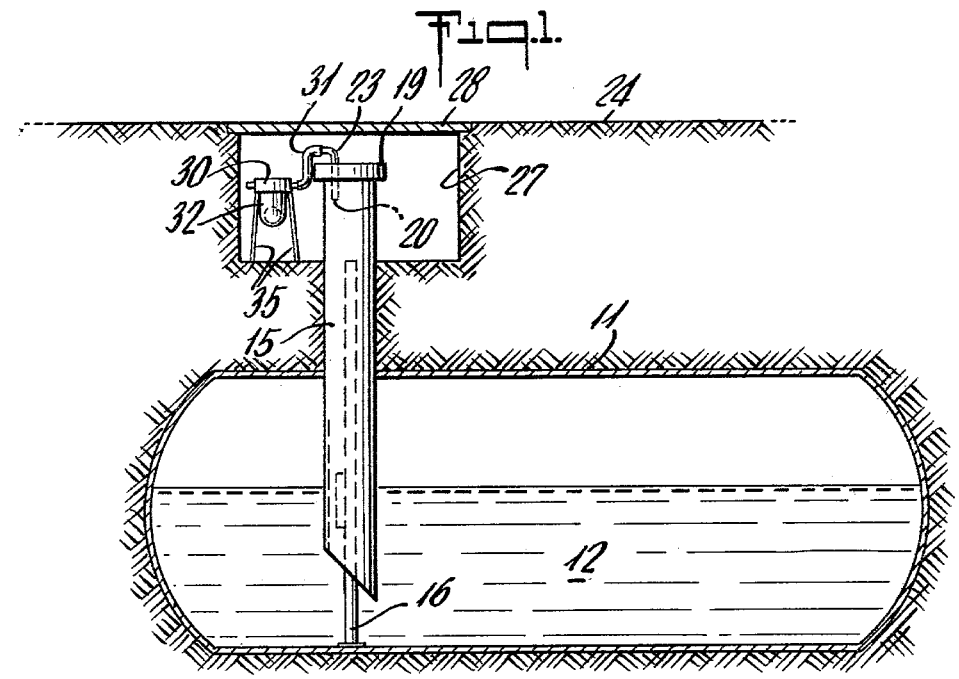
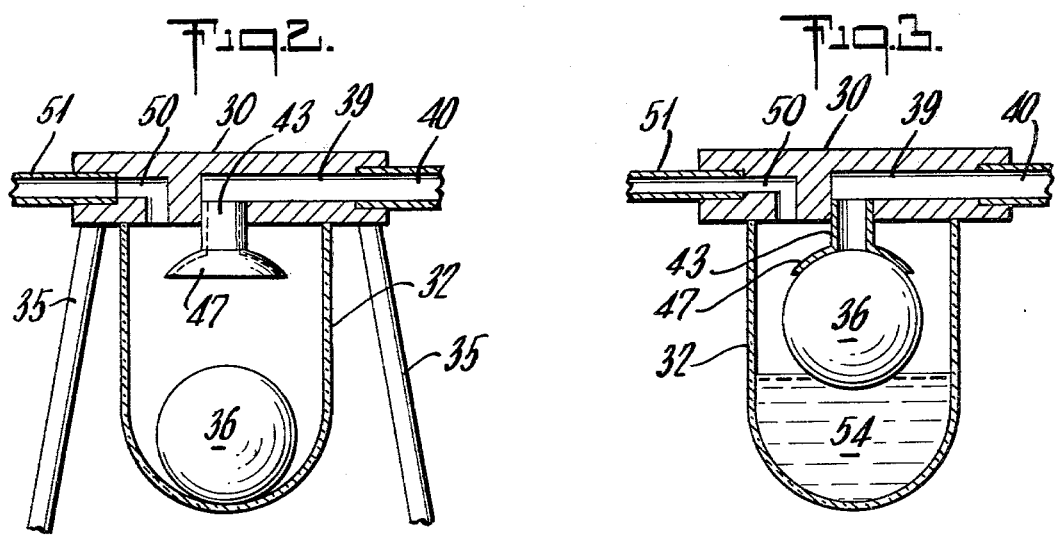
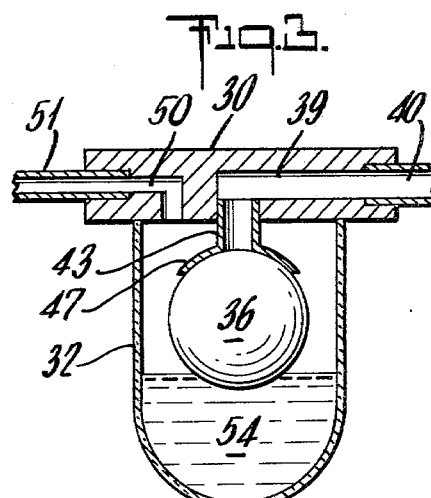

14,327,769

UNDERGROUND TANK FILL PIPE COMBINATION

CROSS REFERENCE TO RELATED APPLICATION

A copending application Ser. No. 925,135 filed July 17, 1978 describes a leak detection instrument which may be employed in conjunction with this invention.

BACKGROUND OF THE INVENTION

1. Field of the Invention

This invention concerns an underground tank fill pipe combination of elements that apply to special protection thereof. It is especially applicable to a fill pipe arrangement that has the top underground and subject to rainwater immersion.

2. Description of the Prior Art

In the past there has been a suggestion for making use of a particular check valve in an arrangement with the vents on marine vessels so as to avoid any sea water from wave action entering the vents. Such a suggestion is embodied by the U.S. Pat. No. 1,851,084, M. W. Brown et al, Mar. 29, 1932. However, this application is concerned with the conditions relating to an underground tank fill tube that has its opening beneath ground level so that collection of rain water tends to inundate the fill pipe. Under such conditions, and when a closure for the fill pipe is employed which has an atmospheric pressure maintenance structure, it would be possible for the rain water to enter the tank through such pressure maintenance opening.

The use of a pressure maintenance arrangement, as indicated above, is required when a leak detection system is being employed to measure the level of product in the underground tank, over an extended period of time. This is because the leak detection indications would be invalidated or inaccurate if during the extended measurement time a rain storm had blocked the atmospheric pressure maintenance opening.

Consequently, it is an object of this invention to provide a combination with the fill pipe of an underground tank that is below ground level (and subject to immersion by rain water) to include an automatic closing of the atmospheric pressure maintenance opening upon rain water rising above a given level. Also, the indication of such blockage is obtained by reason of the construction of the system for so blocking the rain water.

SUMMARY OF THE INVENTION

Briefly, the invention relates to a combination with an underground tank for gasoline or the like having a fill pipe the top of which is below ground level. The said fill pipe has a closure for sealing against vapor loss, except when filling the tank, and there is atmospheric pressure maintenance means associated with said fill pipe closure for maintaining the space in said fill pipe above the product therein at atmospheric pressure. The combination also comprises means integral with said pressure maintenance means for cutting it off upon a predetermined rise in liquid level adjacent to the top of said fill pipe.

Again briefly, the invention is in combination with an underground tank for gasoline or the like product having a fill pipe the top of which is below ground level and subject to being submersed by rain water. The said fill pipe has a closure for sealing against vapor loss except when filling the tank, and there is a small diameter passageway through said closure for maintaining atmospheric pressure in said fill pipe during a product level test for detecting a leak. There is a flexible tube for connecting said small diameter passageway to the top of a transparent liquid reservoir, the said reservoir having a spherical float therein. The said reservoir top has first and second passages therethrough. Said first passage is connected to said flexible tube and has a valve seat with guide means for guiding said spherical float into seating engagement therewith. The said second passage is open to the atmosphere. And, there is a standard for supporting said reservoir adjacent to said fill pipe with the level of said second passage opening to the atmosphere being below said ground level, so that rain water level reaching said second passage will fill said reservoir sufficiently to cause said float to close said first passage.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a schematic cross-sectional showing of a system according to the invention;

FIG. 2 is an enlarged cross-sectional showing of a liquid reservoir with float valve, according to the invention; and FIG. 3 is a showing of the reservoir and float valve elements as shown in FIG. 2, but with the float valve closed following partial filling of the reservoir with rain water.

DESCRIPTION OF THE PREFERRED EMBODIMENT

This invention is particularly applicable to the fill tube of an underground tank for gasoline or the like product. Furthermore, it is for use in connection with a leak detector measurement. Such measurement involves the determination of liquid level in an underground tank. And, it measures change in such level over a considerable period of time. Consequently, it involves the necessity for having a closure on the fill tube provided with a passageway to maintain atmospheric pressure above the product in the fill pipe. Such a leak detection instrument is described in a U.S. patent application, Ser. No. 925,135, filed July 17, 1978, and noted above. However, it is not directly relevant, per se, to this invention. But, it is the requirement that atmospheric pressure be maintained above the product in the fill pipe during leak detection, which gives rise to the combination of elements according to this invention.

Referring to FIG. 1, it will be noted that there is an underground tank 11 that has a product 12 (such as gasoline) therein. There is a fill pipe 15 through which the product 12 is introduced, and also within which a leak detection product level measuring procedure is carried out. Such leak detection procedure makes use of an instrument 16 that is lowered into the tank through the fill pipe 15. It makes a determination of the level of the product 12 over a substantial period of time in order to determine change in that level. The change indicates a leak if it is outside of certain limits. The procedure requires that atmospheric pressure be maintained above the product 12 (within the the fill pipe 15. Consequently, whereas the usual fill pipe 15 would have a closure which seals it against vapor loss, for the purpose of this invention there is a closure 19 that has a small diameter passageway 20 therethrough. The passageway 20 may have a tube 23 mounted therein.

It will be observed that the top of the fill pipe 15, i.e. the closure 19 is below the level of ground 24. Also, there is ordinarily a recess 27 around the top of the fill pipe 15 for providing access thereto. And, there is ordinarily a cover plate 28 over the recess 27 which is usually not watertight. Furthermore, under rainfall conditions water tends to fill the recess 27.

The tube 23 that is in the passageway 20 (through the closure 19) is connected via a flexible hose 31 to a top 30 of a small reservoir 32. Reservoir 32 has a standard formed by legs 35 which support the reservoir 32 with its top 30 below the cover plate 28.

It will be noted in FIGS. 2 and 3 that the reservoir 32 is made up of a transparent bowl, and it has a spherical float 36 therein. The top 30 of the reservoir 32 has a first passage 39 that is connected via a short tube 40 to the flexible tube 31.

At the other end of the passage 39 there is a short pipe 43 that has a combined valve seat and guide means 47 which may be in the form of a spherical sector. It guides the spherical float 36 into contact with the valve seat at the end of the pipe 43 whenever the float rises on rain water or the like, if it should fill the reservoir 32. There is a second passage 50 which connects the inside of the reservoir 32 with the atmosphere through the open end that may extend through a short pipe 51.

It will be understood that if rain water fills the recess 27 to a level that is at or above the opening of pipe 51 and passage 50, the water will run into and fill the reservoir 32, as indicated by a quantity of water 54 shown in FIG. 3. The water 54 will, of course, raise the float 36 and it will be guided into seating contact with the valve seat at the end of the pipe 43 by the combined guide means 47. Consequently, the passage 39 will be closed so that no water will be allowed to flow into the tank 11 and mix with the product 12.

If the foregoing rainwater incursion takes place, it does invalidate the test for leak conditions by blocking the atmospheric pressure maintenance passage. But, the fact that it has happened is observable upon return to the leak detector instrument for a reading. This observability is by reason of the transparency of reservoir 32, and the fact that the water 54 will remain therein until emptied manually.

It will be appreciated that this invention overcomes a problem with the use of a leak detector instrument of the type indicated above, which involves a substantial period of time during which the measurement must take place. During such time, the fill pipe 15 must have atmospheric pressure maintained therein. Buf, if there should be a rain storm it is quite important not to allow rain to mix with the product in the tank. However, in addition to stopping the flow of rain water into the tank, it is important to know afterward that such conditions existed. Consequently, by having the reservoir 32 transparent it is clear that the test was invalid.

While a particular embodiment according to the invention has been described above in considerable detail in accordance with the applicable statutes, this is not to be taken as in any way limiting the invention but merely as being descriptive thereof.

We claim:

1. In combination with an underground tank for gasoline or the like product,
    said tank having a fill pipe the top of which is below ground level and subject to being submersed by rainwater,
    said fill pipe having a closure for sealing against vapor loss except when filling the tank,
    only a single small diameter passageway through said closure for maintaining atmospheric pressure in said fill pipe during a product level test for detecting a leak,
    a transparent liquid reservoir for observing if said small diameter passageway has been closed,
    a flexible tube connecting said small diameter passageway to the top of said transparent liquid reservoir,
    said reservoir having a spherical float therein,
    said reservoir top having first and second passages therethrough,
    said first passage being connected to said flexible tube and having a valve seat with guide means for guiding said spherical float into seating engagement therewith,
    said second passage being open to the atmosphere, and
    a standard for supporting said reservoir adjacent to said fill pipe with the level of said second passage opening to the atmosphere being below said ground level whereby rainwater level reaching said second passage will fill said reservoir sufficiently to cause said float to close said first passage.

* * * * *